(12) United States Patent
Tentorio

(10) Patent No.: US 10,018,167 B2
(45) Date of Patent: Jul. 10, 2018

(54) COMBUSTION CHAMBER ASSEMBLY WITH AN AIR SWIRLER AND A FUEL INJECTOR HAVING INTER-ENGAGING FACES

(71) Applicant: ROLLS-ROYCE PLC, London (GB)

(72) Inventor: Luca Tentorio, Derby (GB)

(73) Assignee: ROLLS-ROYCE plc, London (GB)

( * ) Notice: Subject to any disclaimer, the term of this patent is extended or adjusted under 35 U.S.C. 154(b) by 841 days.

(21) Appl. No.: 14/534,605

(22) Filed: Nov. 6, 2014

(65) Prior Publication Data
US 2016/0169178 A1    Jun. 16, 2016

(30) Foreign Application Priority Data
Dec. 2, 2013    (GB) .................................. 1321193.3

(51) Int. Cl.
*F23R 3/14*    (2006.01)
*F23R 3/60*    (2006.01)
(Continued)

(52) U.S. Cl.
CPC .............. *F02M 61/14* (2013.01); *F02C 7/22* (2013.01); *F02M 57/04* (2013.01);
(Continued)

(58) Field of Classification Search
CPC ...... F23R 3/12; F23R 3/14; F23R 3/28; F23R 3/283; F23R 3/58; F23R 3/60;
(Continued)

(56) References Cited

U.S. PATENT DOCUMENTS 3,385,055 A *  5/1968  Koblish .................... F23R 3/14
60/748
3,413,021 A    11/1968  Potts
(Continued)

FOREIGN PATENT DOCUMENTS

FR    2 987 428 A1    8/2013

OTHER PUBLICATIONS

Jul. 11, 2014 Search Report issued in British Application No. 1321193.3.
(Continued)

*Primary Examiner* — Laert Dounis
(74) *Attorney, Agent, or Firm* — Oliff PLC

(57) ABSTRACT

A combustion chamber includes an upstream end wall having an aperture and a fuel injector. An air swirler is mounted such that the air swirler is movable radially with respect to the aperture. An inner wall of the air swirler has a first portion. A fuel injector head of the fuel injector is arranged coaxially within the air swirler. An outer wall of the fuel injector head has a first portion. The inner diameter of the first portion of the air swirler is less than the outer diameter of the first portion of the fuel injector head. One of the first portions is elastically radially deformable to allow the fuel injector head to be installed and removed from the air swirler. The inner wall and the outer wall have inter-engaging radially and axially extending faces to align the fuel injector head axially and radially within the air swirler.

21 Claims, 5 Drawing Sheets

(51) Int. Cl.
*F23D 11/38* (2006.01)
*F02M 61/14* (2006.01)
*F23R 3/28* (2006.01)
*F02C 7/22* (2006.01)
*F02M 57/04* (2006.01)
*F02M 61/16* (2006.01)

(52) U.S. Cl.
CPC ......... *F02M 61/162* (2013.01); *F23D 11/383* (2013.01); *F23R 3/14* (2013.01); *F23R 3/283* (2013.01); *F23R 3/60* (2013.01); *F23R 2900/00017* (2013.01); *Y02T 50/675* (2013.01)

(58) Field of Classification Search
CPC ...... F23D 11/383; F02M 57/04; F02M 61/14; F02M 61/162
See application file for complete search history.

(56) References Cited

U.S. PATENT DOCUMENTS

| | | | |
|---|---|---|---|
| 3,784,235 A | | 1/1974 | Kessler et al. |
| 3,915,387 A | * | 10/1975 | Caruel ..................... F23R 3/14 239/400 |
| 4,441,323 A | | 4/1984 | Colley |
| 4,453,384 A | | 6/1984 | Pask |
| 4,474,392 A | | 10/1984 | Vassallo et al. |
| 4,999,996 A | | 3/1991 | Duchene et al. |
| 5,737,921 A | * | 4/1998 | Jones ....................... F23C 7/02 239/405 |
| 6,546,732 B1 | * | 4/2003 | Young ..................... F23D 14/78 60/740 |
| 8,763,406 B2 | * | 7/2014 | Pieussergues ............ F23R 3/10 60/756 |
| 2003/0221429 A1 | | 12/2003 | Laing et al. |
| 2008/0000447 A1 | * | 1/2008 | Locatelli ................... F23R 3/14 123/306 |
| 2009/0159725 A1 | | 6/2009 | Prociw et al. |
| 2009/0255265 A1 | | 10/2009 | McMasters et al. |
| 2010/0115956 A1 | * | 5/2010 | Toon ..................... F23D 11/383 60/742 |
| 2010/0194106 A1 | | 8/2010 | Mayr |
| 2012/0240595 A1 | | 9/2012 | Gerendas |

OTHER PUBLICATIONS

Jun. 30, 2015 Extended Search Report Issued in European Application No. 14192006.6.

* cited by examiner

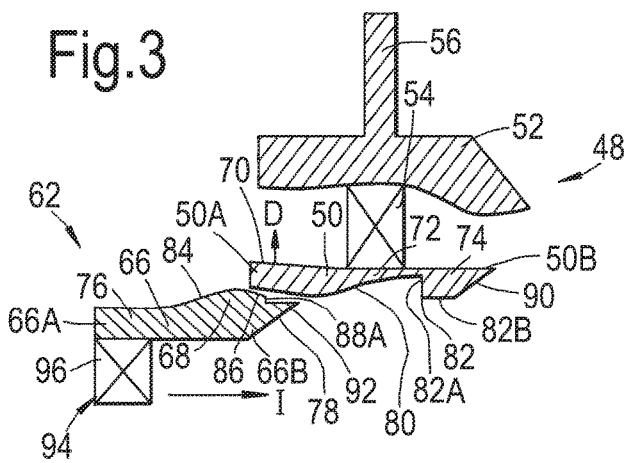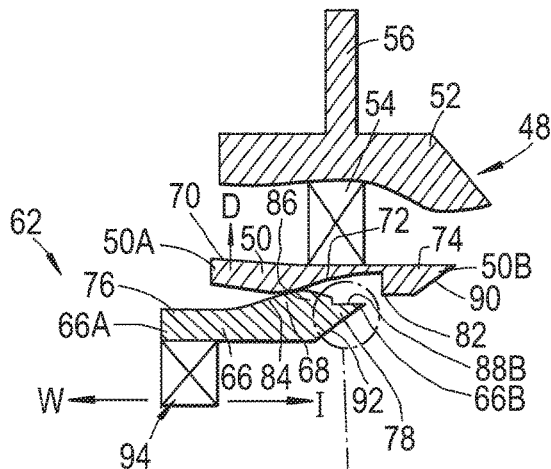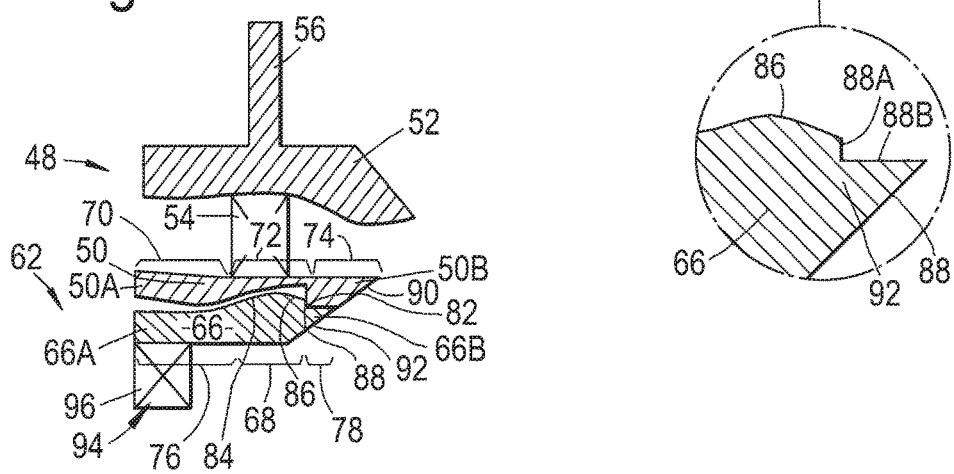

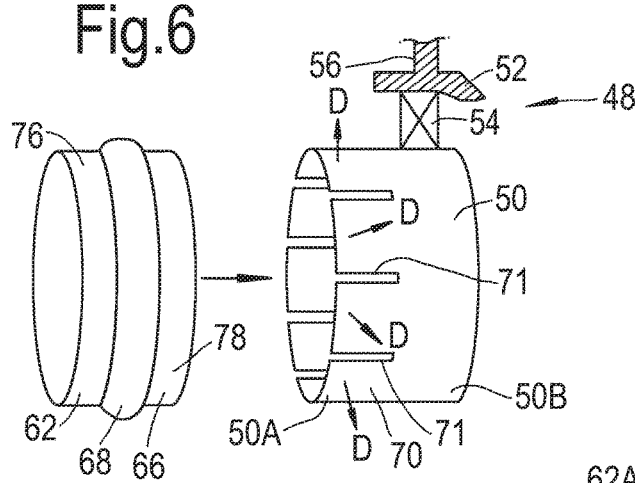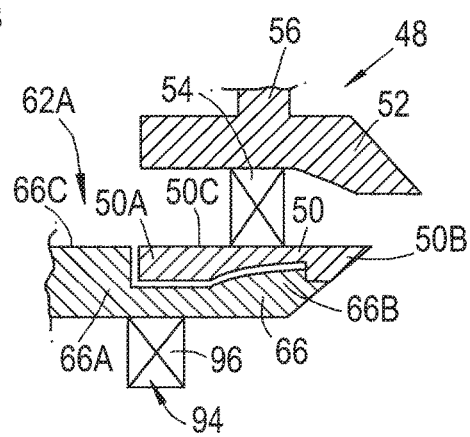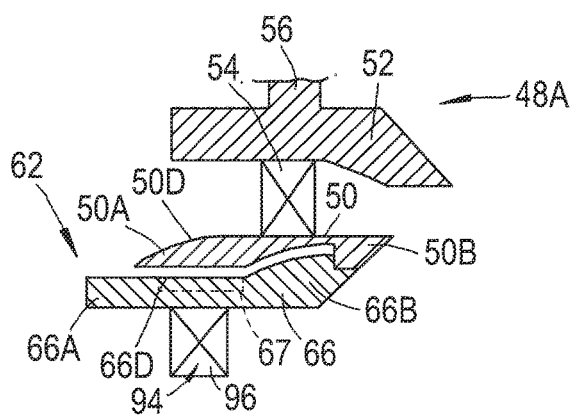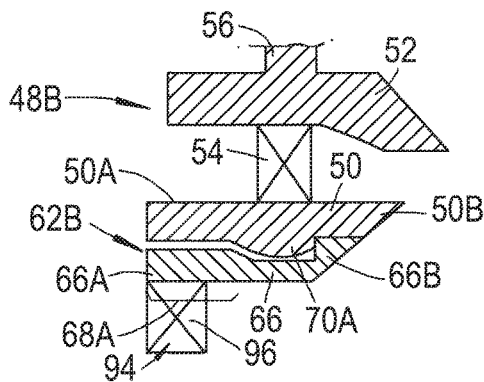

COMBUSTION CHAMBER ASSEMBLY WITH AN AIR SWIRLER AND A FUEL INJECTOR HAVING INTER-ENGAGING FACES

FIELD OF THE INVENTION

The present invention relates to a combustion chamber assembly and in particular to a combustion chamber assembly of a gas turbine engine.

BACKGROUND OF THE INVENTION

A gas turbine engine combustion chamber assembly comprises combustion chamber including a head at its upstream end which has one or more apertures and a corresponding fuel injector is arranged in each of the apertures. A fuel injector generally comprises a fuel injector head having one or more coaxially arranged air swirlers. Currently the majority of fuel injectors are rich burn fuel injectors, but lean burn fuel injectors are desired to reduce emissions from gas turbine engine combustion chambers.

Rich burn fuel injectors generally comprise a fuel injector head which comprises a first air swirler, a first pre-filming surface arranged around the first air swirler and a second air swirler arranged around the first-pre-filming surface and a third air swirler arranged around the second air swirler. Lean burn fuel injectors generally comprise a fuel injector head which comprises a first air swirler, a first pre-filming surface arranged around the first air swirler, a second air swirler arranged around the first-pre-filming surface, a third air swirler around the second air swirler, a second pre-filing surface arranged around the third air swirler and a fourth air swirler arranged around the second pre-filming surface. In some lean burn fuel injectors the fuel injector head also comprises an additional air swirler between the second air swirler and the third air swirler.

Lean burn fuel injector heads require a greater number of air swirlers and this increases the diameter of the fuel injector heads and hence increases the diameter of the apertures in the head of the combustion chamber and the diameter of the apertures in a combustion chamber casing surrounding the combustion chamber.

In one arrangement of combustion chamber assembly each aperture in the head of the combustion chamber has an associated air swirler and the corresponding fuel injector head comprises at least one air swirler and the fuel injector is positioned coaxially within the air swirler in the aperture. In this arrangement there is a problem of relative movement between the fuel injector head and the head of the combustion chamber during operation. This relative movement may lead to misalignment between the air swirler within the aperture in the head of the combustion chamber and the fuel injector head. This may be detrimental to the aerodynamics of the air flows from the fuel injector and the air swirler, may lead to incorrect mixing of the fuel and air and hence incorrect combustion within the combustion chamber, affecting the emissions from the combustion chamber and the acoustic response of the combustion chamber.

In another arrangement of combustion chamber assembly each aperture in the head of the combustion chamber does not have an associated air swirler and the corresponding fuel injector head comprises at least two coaxially arranged air swirlers and the fuel injector head is positioned within the aperture. In this arrangement the aperture in the head of the combustion chamber has a larger diameter to accommodate the fuel injector head comprising at least two coaxially arranged air swirlers. The larger diameter of the aperture in the head of the combustion chamber may increase the stresses within the head of the combustion chamber and may result in cracking. In addition an aperture in a boss of a surrounding combustion chamber casing has a larger diameter to enable the fuel injector to be inserted through the combustion chamber casing to the combustion chamber head. The boss of the combustion chamber casing has to be stronger to support the fuel injector and this adds weight to the combustion chamber casing. The larger diameter of the aperture in the combustion chamber casing may increase the stresses within the combustion chamber casing and may result in cracking. The fuel injector is more expensive due to the manufacturing cost of providing an additional coaxial air swirler on the fuel injector head.

Therefore the present invention seeks to provide a novel combustion chamber assembly which reduces, or overcomes, the above mentioned problems.

STATEMENTS OF THE INVENTION

Accordingly the present invention provides a combustion chamber assembly comprising a combustion chamber including an upstream end wall having at least one aperture and at least one fuel injector,
- an air swirler located within the aperture, the air swirler being mounted in the aperture such that the air swirler is movable radially with respect to the aperture, the air swirler having an annular inner wall, the annular inner wall of the air swirler having a first portion,
- the at least one fuel injector comprising a fuel feed arm and a fuel injector head,
- the fuel injector head of the at least one fuel injector being arranged coaxially within the air swirler,
- the fuel injector head having an annular outer wall, the annular outer wall of the fuel injector head having a first portion,
- the inner diameter of the first portion of the annular inner wall of the air swirler being less than the outer diameter of the first portion of the annular outer wall of the fuel injector head, one of the first portion of the annular inner wall of the air swirler and the first portion of the annular outer wall of the fuel injector head being elastically radially deformable to allow the fuel injector head to be installed and removed from the air swirler, and
- the annular inner wall of the air swirler and the annular outer wall of the fuel injector head having inter-engaging radially and axially extending faces arranged to align the fuel injector head axially within the air swirler and to align the fuel injector head radially within the air swirler.

The first portion of the annular inner wall may have a plurality of circumferentially spaced axially extending slots such that the annular inner wall is elastically radially deformable.

The air swirler may comprise a plurality of swirl vanes extending radially outwardly from the annular inner wall.

The annular inner wall of the air swirler may have an upstream end and a downstream end and the swirl vanes are secured to a second portion of the annular inner wall.

The first portion of the annular inner wall may be upstream of the second portion of the annular inner wall.

The annular inner wall may have a third portion in which the inner diameter of the annular inner wall is less than the outer diameter of the first portion of the annular outer wall of the fuel injector head, the third portion of the annular inner wall is downstream of the second portion of the annular inner wall and the inner diameter of the second portion of the annular inner wall is greater than the outer diameter of the first portion of the annular outer wall of the fuel injector head to axially locate the fuel injector head in the air swirler.

The annular outer wall of the fuel injector head may have an upstream end and a downstream end, the annular outer wall has a second portion upstream of the first portion and a third portion downstream of the first portion and the outer diameter of the third portion is substantially the same as the inner diameter of the third portion of the annular inner wall of the air swirler.

The inner diameter of the second portion of the annular inner wall may increase to a maximum diameter from the first portion to define a ramp and there is a radial step at the intersection of the second portion and the third portion of the annular inner wall.

The outer diameter of the first portion of the annular outer wall may increase to a maximum diameter from the second portion to form a first ramp and the outer diameter decreases from the maximum diameter to from a second ramp and there is a radial step at the intersection of the first portion and the third portion of the annular outer wall.

The downstream end of the annular inner wall may have a conical inner surface and the downstream end of the annular outer wall has a conical inner surface aligned with the conical inner surface of the downstream end of the annular inner wall.

The annular inner wall of the air swirler may have an annular groove on its radially inner surface and the annular groove has a tapered surface at its upstream end and a radial surface at its downstream end and the annular outer wall of the fuel injector head has an annular projection on its radially outer surface and the annular projection has a tapered surface at its upstream end and a tapered surface at its downstream end.

The fuel injector head may include at least one air swirler.

The air swirler of the fuel injector head may comprise a plurality of circumferentially spaced swirl vanes extending radially inwardly from the annular outer wall of the fuel injector head.

The fuel injector head may have a first air swirler, a first pre-filming surface arranged around the first air swirler and a second air swirler arranged around the first-pre-filming surface.

The fuel injector head may have a first air swirler, a first pre-filming surface arranged around the first air swirler, a second air swirler arranged around the first-pre-filming surface, a third air swirler around the second air swirler and second pre-filing surface arranged around the third air swirler.

The fuel injector head may have a fourth air swirler between the second air swirler and the third air swirler.

The air swirler may have an annular outer wall, the annular outer wall of the air swirler has a radially outwardly extending flange and the flange locates in a radial slot defined in the upstream end wall of the combustion chamber. The upstream end wall of the combustion chamber may comprise a head and a heat shield, the flange may locate in a radial slot defined between the head and the heat shield.

The upstream end of the annular inner wall of the air swirler may have an aerodynamically shaped outer surface.

The upstream end of the annular outer wall of the fuel injector head may be shaped and dimensioned so that a radially outer surface of the upstream end is flush with a radially outer surface of the upstream end of the annular inner wall of the air swirler.

The combustion chamber upstream end wall may have a plurality of apertures and a plurality of fuel injectors,
  an air swirler being mounted in each aperture such that each air swirler is movable radially with respect to the respective aperture, each air swirler having an annular inner wall, the annular inner wall of each air swirler having a first portion,
  each fuel injector comprising a fuel feed arm and a fuel injector head,
  the fuel injector head of each fuel injector being arranged coaxially within the air swirler of a corresponding one of the apertures,
  each fuel injector head having an annular outer wall, the annular outer wall of each fuel injector head having a first portion,
  the inner diameter of the first portion of the annular inner wall of each air swirler being less than the outer diameter of the first portion of the annular outer wall of the corresponding fuel injector head, one of the first portion of the annular inner wall of the air swirler and the first portion of the annular outer wall of the fuel injector head being elastically radially deformable to allow the fuel injector head to be installed and removed from the corresponding air swirler, and
  the annular inner wall of each air swirler and the annular outer wall of the corresponding fuel injector head having inter-engaging radially and axially extending faces arranged to align the fuel injector head axially within the air swirler and to align the fuel injector head radially within the air swirler.

The combustion chamber assembly may be a gas turbine engine combustion chamber assembly.

BRIEF DESCRIPTION OF THE DRAWINGS

The present invention will be more fully described by way of example with reference to the accompanying drawings, in which:

FIG. 3 is a further enlarged cross-sectional view of a combustion chamber assembly according to the present invention showing a combustion chamber head, an air swirler and a fuel injector head in an uninstalled position.

FIG. 4 is a further enlarged cross-sectional view of a combustion chamber assembly according to the present invention showing a combustion chamber head, an air swirler and a fuel injector head in a partially installed position.

FIG. 5 is a further enlarged cross-sectional view of a combustion chamber assembly according to the present invention showing a combustion chamber head, an air swirler and a fuel injector head in an installed position.

FIG. 6 is perspective view of a combustion chamber assembly according to the present invention showing an air swirler and a fuel injector head in an uninstalled position.

FIG. 7 is a further enlarged cross-sectional view of an alternative combustion chamber assembly according to the present invention showing a combustion chamber head, an air swirler and a fuel injector head in an installed position.

FIG. 8 is a further enlarged cross-sectional view of another combustion chamber assembly according to the present invention showing a combustion chamber head, an air swirler and a fuel injector head in an installed position.

FIG. 9 is a further enlarged cross-sectional view of a further combustion chamber assembly according to the present invention showing a combustion chamber head, and air swirler and a fuel injector head in an installed position.

DETAILED DESCRIPTION

Figure 1:
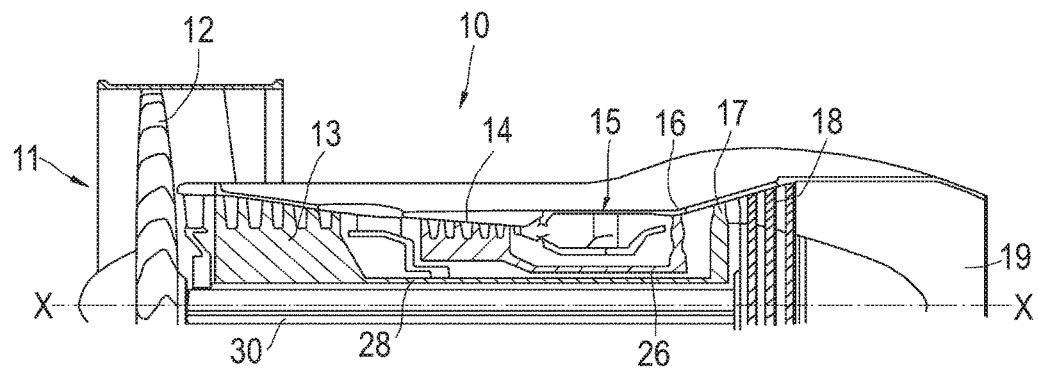
FIG. 1 is partially cut away view of a turbofan gas turbine engine having a combustion chamber assembly according to the present invention.

A turbofan gas turbine engine 10, as shown in FIG. 1, comprises in flow series an intake 11, a fan 12, an intermediate pressure compressor 13, a high pressure compressor 14, a combustion chamber assembly 15, a high pressure turbine 16, an intermediate pressure turbine 17, a low pressure turbine 18 and an exhaust 19. The high pressure turbine 16 is arranged to drive the high pressure compressor 14 via a first shaft 26. The intermediate pressure turbine 17 is arranged to drive the intermediate pressure compressor 13 via a second shaft 28 and the low pressure turbine 18 is arranged to drive the fan 12 via a third shaft 30. In operation air flows into the intake 11 and is compressed by the fan 12. A first portion of the air flows through, and is compressed by, the intermediate pressure compressor 13 and the high pressure compressor 14 and is supplied to the combustion chamber 15. Fuel is injected into the combustion chamber 15 and is burnt in the air to produce hot exhaust gases which flow through, and drive, the high pressure turbine 16, the intermediate pressure turbine 17 and the low pressure turbine 18. The hot exhaust gases leaving the low pressure turbine 18 flow through the exhaust 19 to provide propulsive thrust. A second portion of the air bypasses the main engine to provide propulsive thrust.

Figure 2:
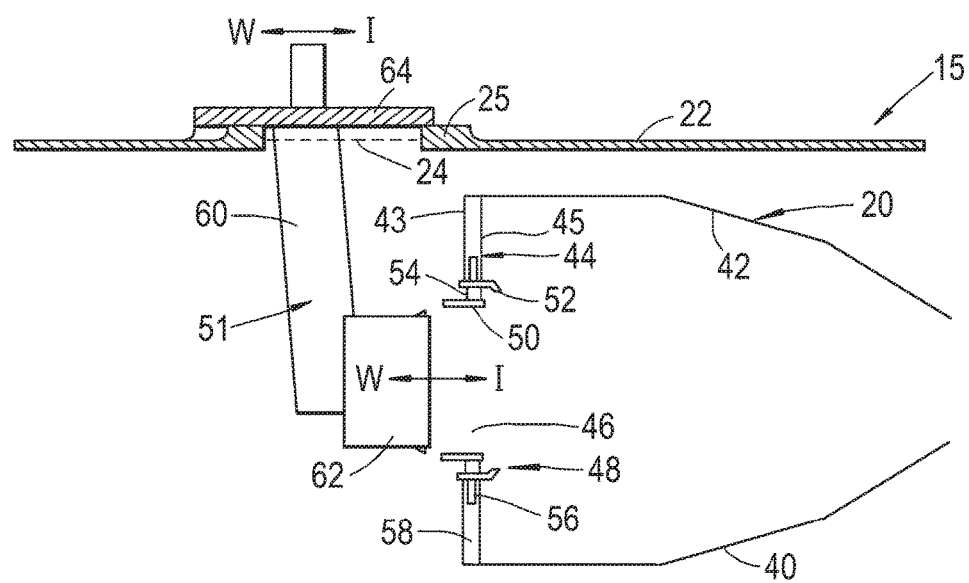
FIG. 2 is an enlarged cross-sectional view of a combustion chamber assembly according to the present invention.

The combustion chamber assembly 15, as shown more clearly in FIG. 2, comprises an annular combustion chamber 20 which comprises a radially annular inner wall structure 40, a radially outer annular wall structure 42 and an upstream end wall structure 44. The upstream end of the radially annular inner wall structure 40 is secured to the upstream end wall structure 44 and the upstream end of the radially annular outer wall structure 42 is secured to the upstream end wall structure 44. The upstream end wall structure 44 has a plurality of circumferentially spaced apertures 46. Each aperture 46 in the upstream end wall structure 44 has a respective one of a plurality of air swirlers 48 located therein. Each air swirler 48 has a respective one of a plurality of fuel injectors 51 located therein. The fuel injectors 51 are arranged to supply fuel into the annular combustion chamber 15 during operation of the gas turbine engine 10. The combustion chamber assembly 15 also comprises an annular combustion chamber casing 22 which surrounds the annular combustion chamber 20. The annular combustion chamber casing 22 has a plurality of circumferentially spaced apertures 24 located in respective bosses 25 and each fuel injector 51 extends through a respective one of the apertures 24 in the annular combustion chamber casing 22.

The upstream end wall 44 of the annular combustion chamber 20 comprises a head, or metering panel, 26 and a heat shield 45 positioned downstream of, spaced from and mounted on the head 43. The head 43 has a plurality of circumferentially spaced apertures and the heat shield 45 has a plurality of apertures each one of which is aligned with a corresponding one of the apertures in the head 43 to form one of the apertures 46 in the upstream end wall structure 44. Each aperture 46 in the upstream end wall structure 44 has an air swirler 48 located coaxially within the aperture 46. Each air swirler 48 comprises an annular inner wall 50, an annular outer wall 52, a plurality of swirl vanes 54 extending radially outwardly from the annular inner wall 50 to the annular outer wall 52 and a flange 56 extending radially outwardly from the annular outer wall 52. Each flange 56 locates in the upstream end wall structure 44 of the combustion chamber 20. For example each flange 56 locates in a radial slot defined by an axial gap 58 between the head 43 and the heat shield 45. The flanges 56 may locate in a radial slot defined by an axial gap between the head 43 and another member positioned upstream of, spaced from and mounted on the head 43. The head 43 also has a plurality of coolant apertures (not shown) extending there-through to direct coolant onto the upstream surface of the heat shield 45 to provide impingement cooling of the heat shield 45 and the heat shield 45 has a plurality of apertures (not shown) extending there-through to provide a film of coolant on the downstream surface of the heat shield 45.

Each fuel injector 51 comprises a fuel feed arm 60, a fuel injector head 62 and a flange 64. The fuel feed arm 60 of each fuel injector 51 extends through a respective one of the apertures 24 in the annular combustion chamber casing 22 and the flange 64 of each fuel injector 51 is secured to a respective one of the bosses 25 on the annular combustion chamber casing 22 by suitable fasteners, e.g. bolts (not shown). The fuel injector head 62 of each fuel injector 51 is arranged coaxially within the air swirler 48 of the respective aperture 46 in the upstream end wall structure 44.

Each fuel injector head 62 comprises an annular outer wall 66 and each fuel injector head 62 includes at least one air swirler 94. The air swirler 94 of each fuel injector head 62 comprises a plurality of circumferentially spaced swirl vanes 96 extending radially inwardly from the annular outer wall 66 of the fuel injector head 62. The annular outer wall 66 of the fuel injector head 62 has a first portion 68 in which the outer diameter of the annular outer wall 66 is greater than the outer diameter of the remainder of the annular outer wall 66, as shown more clearly in FIGS. 3 to 6. The annular inner wall 50 of the air swirler 48 has a first portion 70 in which the inner diameter of the annular inner wall 50 is less than the outer diameter of the first portion 68 of the annular outer wall 66 of the fuel injector head 62. The first portion 70 of the annular inner wall 50 of the air swirler 48 is elastically radially deformable to allow the fuel injector head 62 to be installed and removed from the air swirler 48. The annular inner wall 50 of the air swirler 48 and the annular outer wall 66 of the fuel injector head 62 have radially extending faces 82A and 88A arranged to limit relative axial movement of the fuel injector head 62 within the air swirler 48 and cylindrical faces 82B and 88B arranged to align the fuel injector head 62 within the air swirler 48.

The first portion 70 of the annular inner wall 50 of the air swirler 48 has a plurality of circumferentially spaced axially extending slots 71 such that the annular inner wall 50 is elastically radially deformable. The annular inner wall 50 of the air swirler 48 has an upstream end 50A and a downstream end 50B and the swirl vanes 54 are secured to a second portion 72 of the annular inner wall 50. The first portion 70 of the annular inner wall 50 is upstream of the second portion 72 of the annular inner wall 50 of the air swirler 48. The annular inner wall 50 has a third portion 74 in which the inner diameter of the annular inner wall 50 is less than the outer diameter of the first portion 68 of the annular outer wall 66 of the fuel injector head 62 and the third portion 74 of the annular inner wall 50 is downstream of the second portion 72 of the annular inner wall 50. The inner diameter of the second portion 72 of the annular inner wall 50 is greater than the outer diameter of the first portion 68 of the annular outer wall 66 of the fuel injector head 62 to axially locate the fuel injector head 62 in the air swirler 48.

The annular outer wall 66 of the fuel injector head 62 has an upstream end 66A and a downstream end 66B. The annular outer wall 66 of the fuel injector head 62 has a second portion 76 upstream of the first portion 68 and a third portion 78 downstream of the first portion 68 and the outer diameter of the third portion 78 is substantially the same as the inner diameter of the third portion 74 of the annular inner wall 50 of the air swirler 48. The inner diameter of the second portion 72 of the annular inner wall 50 of the air swirler 48 increases to a maximum diameter from the first portion 70 to define a ramp 80 and there is a step 82 at the intersection of the second portion 72 and the third portion 74 of the annular inner wall 50 of the air swirler 48. The ramp 80 continues to the minimum diameter of the first portion 68 of the annular inner wall 50. The step 82 comprises a radial face 82A and a cylindrical inner surface 82B.

The outer diameter of the first portion 68 of the annular outer wall 66 of the fuel injector head 62 increases to a maximum diameter from the second portion 76 to form a first ramp 84 and the outer diameter of the first portion 68 decreases from the maximum diameter to form a second ramp 86 and there is a step 88 at the intersection of the first portion 68 and the third portion 78 of the annular outer wall 66 of the fuel injector head 62. The step 88 comprises a radial face 88A and a cylindrical outer surface 88B.

Thus, the annular inner wall 50 of the air swirler 48 has an annular groove on its radially inner surface and the annular groove has a tapered surface at its upstream end and a radial surface at its downstream end, e.g. as defined by the ramp 80 and the radial step 82 of the inner surface of the second portion 72 of the annular inner wall 50 of the air swirler 48, and the annular outer wall 66 of the fuel injector head 62 has an annular projection on its radially outer surface and the annular projection has a tapered surface at its upstream end and a tapered surface at its downstream end, e.g. as defined by the first ramp 84 and the second ramp 86 of the first portion 68 of the annular outer wall 66 of the fuel injector head 62.

The downstream end 50B of the annular inner wall 50 of the air swirler 50 has a conical inner surface 90 and the downstream end 66B of the annular outer wall 66 of the fuel injector head 62 has a conical inner surface 92 aligned with the conical inner surface 90 of the downstream end 50B of the annular inner wall 50 of the air swirler 48.

In this example the cylindrical inner surface 82B and the cylindrical outer surface 88B have a diameter less than the diameter of the first portion 70 of the annular inner wall 50 of the air swirler 48. The cylindrical inner surface 82B and the cylindrical outer surface 88B have a diameter greater than the diameter of the first portion 68 of the annular outer wall 66 of the fuel injector head 62.

FIGS. 3 to 5 show different stages during the installation, or withdrawn, of a fuel injector head 62 into an air swirler 48 mounted within an aperture 46 in the upstream end wall structure 44 of an annular combustion chamber 20.

FIG. 3 shows the fuel injector head 62 in an uninstalled position with the fuel injector head 62 generally upstream of, and aligned with, the air swirler 48 and the downstream end 66B of the annular outer wall 66 of the fuel injector head 62 just entering the annular inner wall 50 and just downstream of the upstream end 50A of the annular inner wall 50 of the air swirler 48. The fuel injector head 62 is inserted in a downstream direction. In this position the first portion 68 of the annular outer wall 66 of the fuel injector head 62 abuts the inner surface at the upstream end 50A of the annular inner wall 50 and deforms D the first portion 70 of the annular inner wall 50 of the air swirler 48. In particular the upstream end 50A and the first portion 70 of the annular inner wall 50 of the air swirler 48 is being pushed radially outwardly by the second ramp 86 of the first portion 68 of the annular outer wall 66 of the fuel injector head 62 to enable the first portion 68 of the annular outer wall 66 to move axially into the air swirler 48.

FIG. 4 shows the fuel injector head 62 in a partially installed position with the fuel injector head 62 generally within, and aligned with, the air swirler 48 and the first portion 68 of the annular outer wall 66 of the fuel injector head 62 is at the downstream end of the first portion 70 of the annular inner wall 50 and just upstream of the second portion 72 of the annular inner wall 50 of the air swirler 48. The first portion 68 of the annular inner wall 50 has been deformed radially outwardly. In this position the first ramp 84 of the annular outer wall 66 of the fuel injector head 62 abuts the ramp 80 of the annular inner wall 50 of the air swirler 48 and the fuel injector head 62 is able to easily move axially in a downstream along the ramp 80 to the position shown in FIG. 5.

FIG. 5 shows the fuel injector head 62 in an installed position with the fuel injector head 62 generally within, and aligned with, the air swirler 48 and the first portion 68 of the annular outer wall 66 of the fuel injector head 62 is axially aligned with the second portion 72 of the annular inner wall 50 of the air swirler 48. In this position radial face 88A of the step 88 of the annular outer wall 66 of the fuel injector head 62 abuts the radial face 82A of the step 82 of the annular inner wall 50 of the air swirler 48 and the fuel injector head 62 is accurately located within the air swirler 48. The cylindrical outer surface 88B of the step 88 of the third portion 78 of the annular outer wall 66 of the fuel injector head 62 abuts the cylindrical inner surface 82B of the step 82 of the third portion 74 of the annular outer wall 50 of the air swirler and the conical inner surface 90 at the downstream end 50B of the annular inner wall 50 of the air swirler 48 forms a continuation of the conical inner surface at the downstream end 66B of the annular outer wall 66 of the fuel injector head 62. In addition it is to be noted that the first portion 70 of the annular inner wall 50 has returned to an un-deformed position due to its elasticity, or resilience. The fuel injector 51 is then secured to the annular combustion chamber casing 22 by bolting the flange 64 to the associated boss 25 on the annular combustion chamber casing 22 and the fuel injector head 62 is then maintained in position in the corresponding air swirler 48.

FIG. 4 also shows that as the fuel injector head 62 in a partially withdrawn, or partially uninstalled, position with the fuel injector head 62 generally within, and aligned with, the air swirler 48 and the first portion 68 of the annular outer wall 66 of the fuel injector head 62 is at the downstream end of the first portion 70 of the annular inner wall 50 and just upstream of the second portion 72 of the annular inner wall 50 of the air swirler 48. The fuel injector head 62 is withdrawn W in an upstream direction. In this position the first portion 68 of the annular outer wall 66 of the fuel injector head 62 abuts the inner surface of the annular inner wall 50 and deforms D the first portion 70 of the annular inner wall 50 of the air swirler 48. In particular the first portion 70 of the annular inner wall 50 of the air swirler 48 is being pushed radially outwardly by the first ramp 84 of the first portion 68 of the annular outer wall 66 of the fuel injector head 62 to enable the first portion 68 of the annular outer wall 66 to move axially out of the air swirler 48. In this position the first ramp 84 of the annular outer wall 66 of the fuel injector head 62 abuts the ramp 80 of the annular inner wall 50 of the air swirler 48 and the fuel injector head 62 to push the first portion 70 of the annular inner wall 50 of the air swirler 48 radially outwardly.

The step 82 of the annular inner wall 50 of the air swirler 48 and the step 88 of the annular outer wall 66 of the fuel injector head 62 locate the fuel injector head 62 accurately within the air swirler 48. The air swirler 48 is able to move freely, or float, radially in any direction within the aperture 46 in the upstream end wall structure 44 because the flange 56 of the air swirler 48 is freely mounted in the axial gap 58 between the head 26 and the heat shield 28 of the upstream end wall 44. This enables the air swirler 48 to move with the fuel injector head 62 to maintain alignment of the fuel injector head 62 and the air swirler 48 to compensate for differential movement between the fuel injector 51 and the combustion chamber 20. The annular inner wall 50 of the air swirler 48 and the annular outer wall 66 of the fuel injector head 62 having inter-engaging radially extending faces 82A and 88A respectively and axially extending faces 82B and 88B respectively arranged to align the fuel injector head 62 axially within the air swirler 48 and to align the fuel injector head 62 radially within the air swirler 48.

FIG. 7 shows an alternative arrangement for the fuel injector head 62A as installed in the air swirler 48. The fuel injector head 62A and the air swirler 48 are substantially the same as described with reference to FIGS. 3 to 6. The fuel injector head 62A differs from the fuel injector head 62 in that the upstream end 66A of the annular outer wall 66 of the fuel injector head 62A is shaped and dimensioned so that a radially outer surface 66C of the upstream end 66A is flush with a radially outer surface 50C of the upstream end 50A of the annular inner wall 50 of the air swirler 48, e.g. the diameter of the radially outer surface 66C of the upstream end 66A of the annular outer wall 66 is substantially the same as the diameter of the radially outer surface 50C of the upstream end 50A of the annular inner wall 50. This has the advantage of providing an aerodynamically smooth flow over the surfaces 66C and 50C to the swirler vanes 54 of the air swirler 48 compared to the step shown in FIG. 5.

FIG. 8 shows an alternative arrangement for the air swirler 48A with the fuel injector head 62 installed. The fuel injector head 62 and the air swirler 48A are substantially the same as described with reference to FIGS. 3 to 6. The air swirler 48A differs from the air swirler 48 in that the upstream end 50A of the annular inner wall 50 of the air swirler 48A has an aerodynamically shaped outer surface 50D. This also has the advantage of providing an aerodynamically smooth flow over the surface 50D to the swirler vanes 54 of the air swirler 48 compared to the step shown in FIG. 5. The upstream end 50A of the annular inner wall 50 is configured, shaped and dimensioned, such that during operation of the turbofan gas turbine engine 10 the dynamic head of the air flow over the surface 50D pushes radially inwardly on the upstream end 50A of the inner annular wall 50 so that the upstream end 50A abuts a radially outer surface 66D of the annular outer wall 66 and provides a clamping force on the outer surface 66D of the annular outer wall 66. When the turbofan gas turbine engine 10 is not in operation the fuel injector 62 is easily removed from the air swirler 48. In another arrangement, shown in dashed lines, the radially outer surface 66D of the annular outer wall 66 may be provided with an annular groove 67, such that during operation of the turbofan gas turbine engine 10 the dynamic head of the air flow over the surface 50D pushes radially inwardly on the upstream end 50A of the inner annular wall 50 so that the upstream end 50A of the annular inner wall 50 may be pushed radially inwardly into the annular groove 67 and provides a clamping force on the outer surface 66D of the annular outer wall 66 within the annular groove 67. When the turbofan gas turbine engine 10 is not in operation the fuel injector head 62 is easily removed from the air swirler 48.

FIG. 9 shows an alternative arrangement for the air swirler 48B with the fuel injector 62B installed. The fuel injector head 62B and the air swirler 48B are similar to those described with reference to FIGS. 3 to 6. Each fuel injector head 62B comprises an annular outer wall 66 and each fuel injector head 62 includes at least one air swirler 94. The air swirler 94 of each fuel injector head 62 comprises a plurality of circumferentially spaced swirl vanes 96 extending radially inwardly from the annular outer wall 66 of the fuel injector head 62. The annular outer wall 66 of the fuel injector head 62B has a first portion 68A. The annular inner wall 50 of the air swirler 48B has a first portion 70A in which the inner diameter of the annular inner wall 50 is less than the outer diameter of the first portion 68A of the annular outer wall 66 of the fuel injector head 62B. The first portion 70A of the annular inner wall 50 of the air swirler 48B is elastically radially deformable to allow the fuel injector head 62B to be installed and removed from the air swirler 48B. The annular inner wall 50 of the air swirler 48B and the annular outer wall 66 of the fuel injector head 62B have radially extending faces 82A and 88A arranged to limit relative axial movement of the fuel injector head 62B within the air swirler 48B and cylindrical faces 82B and 88B arranged to align the fuel injector head 62B within the air swirler 48B. Thus, it seen that the arrangement in FIG. 9 is an opposite arrangement of FIGS. 3 to 6, in that the annular outer wall 66 of the fuel injector head 62B has an annular groove on its radially outer surface and the annular groove has a tapered surface at its upstream end and a radial surface at its downstream end, e.g. as defined by a ramp and a radial step of the outer surface of the annular outer wall 66 of the fuel injector head 62B, and the annular inner wall 50 of the air swirler 48B has an annular projection on its radially inner surface and the annular projection has a tapered surface at its upstream end and a tapered surface at its downstream end, e.g. as defined by a first ramp and a second ramp of the first portion 70A of the annular inner wall 50 of the air swirler 48B.

The downstream end 50B of the annular inner wall 50 of the air swirler 50 has a conical inner surface 90 and the downstream end 66B of the annular outer wall 66 of the fuel injector head 62 has a conical inner surface 92 aligned with the conical inner surface 90 of the downstream end 50B of the annular inner wall 50 of the air swirler 48.

The first portion of the annular inner wall of the air swirler is elastically radially expandable or the first portion of the annular outer wall of the fuel injector head is elastically radially compressible. The first portion of the annular inner wall of the air swirler or the first portion of the annular outer wall of the fuel burner head may comprise a sheet metal member which is elastically radially expandable or elastically radially compressible respectively. The sheet metal may be provided with circumferentially spaced axially extending slots.

The present invention is applicable to different types of fuel injector, for example the present invention is applicable to rich burn fuel injectors and is applicable to lean burn fuel injectors.

Figure 10:
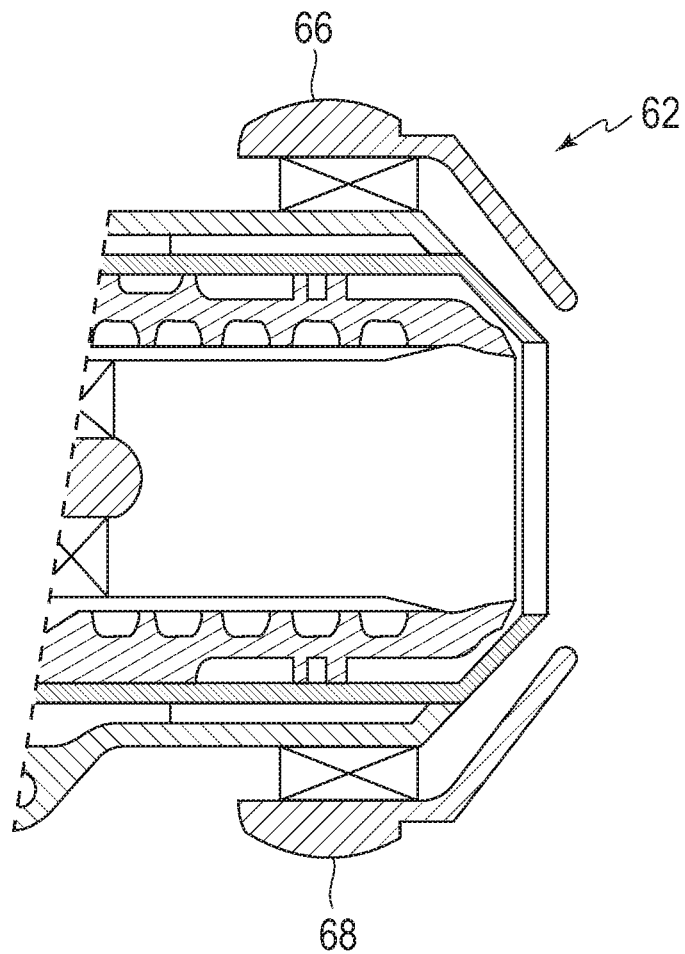
FIG. 10 is an enlarged cross-sectional view of an injector head for a rich burn fuel injector according to the present invention.
Figure 11:
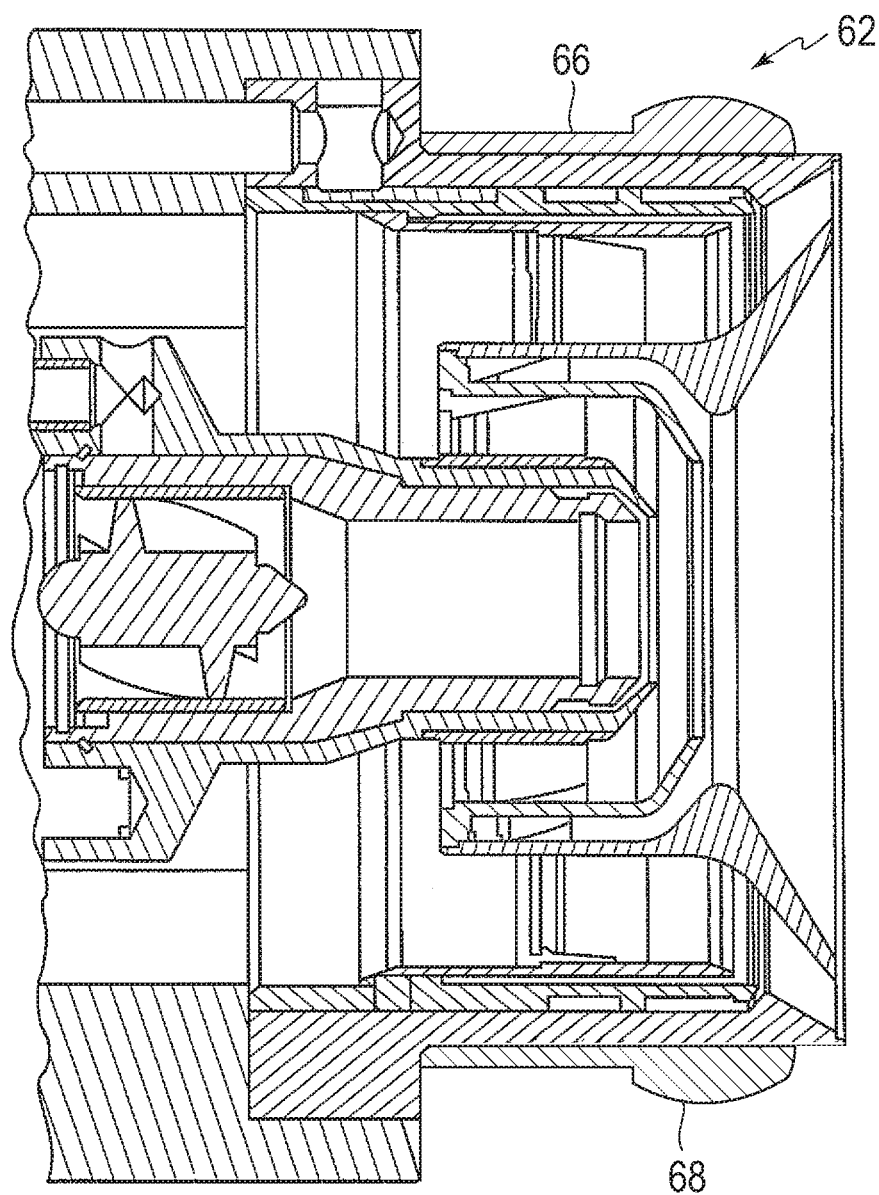
FIG. 11 is an enlarged cross-sectional view of an injector head for a lean burn fuel injector according to the present invention.

In the present invention in the case of a rich burn fuel injector, as shown in FIG. 10, the fuel injector head comprises a first air swirler, a first pre-filming surface arranged around the first air swirler and a second air swirler arranged around the first-pre-filming surface and no third air swirler. The air swirler mounted in the aperture in the upstream end wall takes the place of the third air swirler. In the present invention in the case of a lean burn fuel injector, as shown in FIG. 11, the fuel injector head comprises a first air swirler, a first pre-filming surface arranged around the first air swirler, a second air swirler arranged around the first-pre-filming surface, a third air swirler around the second air swirler and a second pre-filing surface arranged around the third air swirler and no fourth air swirler. The air swirler mounted in the aperture in the upstream end wall takes the place of the fourth air swirler. In some lean burn fuel injectors the fuel injector head also comprises an additional air swirler between the second air swirler and the third air swirler. In one example the conical inner surface of the annular outer wall of the fuel injector head has an annular slot to supply fuel onto the conical inner surface and thus the conical inner surface forms the second pre-filming surface of a lean burn fuel injector.

The advantages of the present invention are that by providing an air swirler in the aperture in the head of the combustion chamber the outer diameter of the fuel injector head is reduced and hence the diameter of the aperture and the stresses within the head of the combustion chamber are reduced. The diameter of the aperture in the surrounding combustion chamber casing and hence the stresses within the combustion chamber casing are reduced. The flange on the fuel injector is smaller and has reduced weight. The weight of the combustion chamber is reduced. The fuel injector is less complicated and less expensive due to the reduced manufacturing cost of providing one less coaxial air swirler on the fuel injector head. Relative movement and misalignment between the air swirler within the aperture in the head of the combustion chamber and the fuel injector head is reduced and hence the possibility of detrimental aerodynamics of the air flows from the fuel injector and the air swirler, insufficient mixing of the fuel and air and incorrect combustion within the combustion chamber are reduced.

Although the present invention has been described with reference to the use of axial slots in the annular inner wall of the air swirler to provide elastic deformation of the annular inner wall the annular inner wall may be otherwise arranged to be elastically deformable.

Although the present invention has been described with reference to the annular wall of the air swirler being elastically deformable radially outwardly to enable the fuel injector head to be inserted and/or removed from the air swirler it is equally possible for the fuel injector head to be elastically deformable radially inwardly to enable the fuel injector head to be inserted and/or removed from the air swirler.

Although the present invention has been described with reference to an annular combustion chamber it is equally applicable to a tubo-annular combustions chamber or a tubular combustion chamber.

Although the present invention has been described with reference to a combustion chamber assembly of a turbofan gas turbine engine it is equally applicable to a turbojet gas turbine engine, a turbopropeller gas turbine engine or a turboshaft gas turbine engine.

Although the present invention has been described with reference to combustion chamber assembly of an aircraft gas turbine engine it is equally applicable to a marine gas turbine engine, an automotive gas turbine engine or an industrial gas turbine engine.

Although the present invention has been described with reference to a gas turbine engine combustion chamber assembly it may be equally applicable to other combustion chamber assemblies.

The invention claimed is:

1. A combustion chamber assembly comprising a combustion chamber including an upstream end wall having at least one aperture and at least one fuel injector,
   an air swirler located within the aperture, the air swirler being mounted in the aperture such that the air swirler is movable radially with respect to the aperture, the air swirler having an annular inner wall, the annular inner wall of the air swirler having a first portion,
   the at least one fuel injector comprising a fuel feed arm and a fuel injector head,
   the fuel injector head of the at least one fuel injector being arranged coaxially within the air swirler,
   the fuel injector head having an annular outer wall, the annular outer wall of the fuel injector head having a first portion,
   the inner diameter of the first portion of the annular inner wall of the air swirler being less than the outer diameter of the first portion of the annular outer wall of the fuel injector head, one of the first portion of the annular inner wall of the air swirler and the first portion of the annular outer wall of the fuel injector head being elastically radially deformable to allow the fuel injector head to be installed and removed from the annular inner wall of the air swirler, and
   the annular inner wall of the air swirler and the annular outer wall of the fuel injector head each having a radial step, the radial step of the annular inner wall of the air swirler and the radial step of the annular outer wall of the fuel injector head configured to engage to align the fuel injector head within the air swirler.

2. A combustion chamber assembly as claimed in claim 1 wherein the first portion of the annular inner wall has a plurality of circumferentially spaced axially extending slots such that the annular inner wall is elastically radially deformable.

3. A combustion chamber assembly as claimed in claim 1 wherein the air swirler comprises a plurality of swirl vanes extending radially outwardly from the annular inner wall, and the annular inner wall of the air swirler has an upstream end and a downstream end and the swirl vanes are secured to a second portion of the annular inner wall.

4. A combustion chamber assembly as claimed in claim 3 wherein the first portion of the annular inner wall are upstream of the second portion of the annular inner wall.

5. A combustion chamber assembly as claimed in claim 3 wherein the annular inner wall has a third portion in which the inner diameter of the annular inner wall is less than the outer diameter of the first portion of the annular outer wall of the fuel injector head, the third portion of the annular inner wall is downstream of the second portion of the annular inner wall and the inner diameter of the second portion of the annular inner wall is greater than the outer diameter of the first portion of the annular outer wall of the fuel injector head to axially locate the fuel injector head in the air swirler.

6. A combustion chamber assembly as claimed in claim 5 wherein the annular outer wall of the fuel injector head has an upstream end and a downstream end, the annular outer wall having a second portion upstream of the first portion and a third portion downstream of the first portion and the outer diameter of the third portion are substantially the same as the inner diameter of the third portion of the annular inner wall of the air swirler.

7. A combustion chamber assembly as claimed in claim 6 wherein the inner diameter of the second portion of the annular inner wall increases to a maximum diameter from the first portion to define a ramp, and the radial step of the annular inner wall is positioned at the intersection of the second portion and the third portion of the annular inner wall.

8. A combustion chamber assembly as claimed in claim 6 wherein the outer diameter of the first portion of the annular outer wall gradually increases to a maximum diameter from the second portion to form a first ramp and the outer diameter gradually decreases from the maximum diameter to form a second ramp, and the radial step of the annular outer wall is positioned at the intersection of the first portion and the third portion of the annular outer wall.

9. A combustion chamber assembly as claimed in claim 1 wherein the downstream end of the annular inner wall has a conical inner surface and the downstream end of the annular outer wall having a conical inner surface aligned with the conical inner surface of the downstream end of the annular inner wall.

10. A combustion chamber assembly as claimed in claim 1 wherein the annular inner wall of the air swirler has an annular groove on its radially inner surface and the annular groove has a tapered surface at its upstream end and a radial surface at its downstream end and the annular outer wall of the fuel injector head having an annular projection on its radially outer surface and the annular projection has a tapered surface at its upstream end and a tapered surface at its downstream end.

11. A combustion chamber assembly as claimed in claim 1 wherein the fuel injector is a rich burn fuel injector, the fuel injector head having a first air swirler, a first pre-filming surface arranged around the first air swirler and a second air swirler arranged around the first-pre-filming surface.

12. A combustion chamber assembly as claimed in claim 1 wherein the fuel injector is a lean burn fuel injector, the fuel injector head having a first air swirler, a first pre-filming surface arranged around the first air swirler, a second air swirler arranged around the first-pre-filming surface, a third air swirler around the second air swirler and second pre-filming surface arranged around the third air swirler.

13. A combustion chamber assembly as claimed in claim 12 wherein the fuel injector head has a fourth air swirler between the second air swirler and the third air swirler.

14. A combustion chamber assembly as claimed in claim 1 wherein the air swirler has an annular outer wall, the annular outer wall of the air swirler having a radially outwardly extending flange and the flange locating in a radial slot defined in the upstream end wall of the combustion chamber.

15. A combustion chamber assembly as claimed in claim 1 wherein the upstream end of the annular inner wall of the air swirler has an aerodynamically shaped outer surface.

16. A combustion chamber assembly as claimed in claim 1 wherein the upstream end of the annular outer wall of the fuel injector head is shaped and dimensioned so that a radially outer surface of the upstream end is flush with a radially outer surface of the upstream end of the annular inner wall of the air swirler.

17. A combustion chamber assembly as claimed in claim 1 wherein the combustion chamber upstream end wall has a plurality of apertures and a plurality of fuel injectors,
   an air swirler being mounted in each aperture such that each air swirler is movable radially with respect to the respective aperture, each air swirler having an annular inner wall, the annular inner wall of each air swirler having a first portion,
   each fuel injector comprising a fuel feed arm and a fuel injector head,
   the fuel injector head of each fuel injector being arranged coaxially within the air swirler of a corresponding one of the apertures,
   each fuel injector head having an annular outer wall, the annular outer wall of each fuel injector head having a first portion,
   the inner diameter of the first portion of the annular inner wall of each air swirler being less than the outer diameter of the first portion of the annular outer wall of the corresponding fuel injector head, one of the first portion of the annular inner wall of the air swirler and the first portion of the annular outer wall of the fuel injector head being elastically radially deformable to allow the fuel injector head to be installed and removed from the corresponding air swirler, and
   the annular inner wall of each air swirler and the annular outer wall of the corresponding fuel injector head having inter-engaging radially and axially extending faces arranged to align the fuel injector head axially within the air swirler and to align the fuel injector head radially within the air swirler.

18. A combustion chamber assembly as claimed in claim 1 wherein the combustion chamber assembly is a gas turbine engine combustion chamber assembly.

19. A combustion chamber assembly as claimed in claim 1 wherein:
   the fuel injector head includes at least one air swirler, and
   the air swirler of the fuel injector head comprises a plurality of circumferentially spaced swirl vanes extending radially inwardly from the annular outer wall of the fuel injector head.

20. A combustion chamber assembly comprising a combustion chamber including an upstream end wall having at least one aperture and at least one fuel injector,
   an air swirler located within the aperture, the air swirler being mounted in the aperture such that the air swirler is movable radially with respect to the aperture, the air swirler having an annular inner wall, the annular inner wall of the air swirler having a first portion,
   the at least one fuel injector comprising a fuel feed arm and a fuel injector head,
   the fuel injector head of the at least one fuel injector being arranged coaxially within the air swirler,
   the fuel injector head having an annular outer wall, the annular outer wall of the fuel injector head having a first portion,
   the inner diameter of the first portion of the annular inner wall of the air swirler being less than the outer diameter of the first portion of the annular outer wall of the fuel injector head, one of the first portion of the annular inner wall of the air swirler and the first portion of the annular outer wall of the fuel injector head being elastically radially deformable to allow the fuel injector head to be installed and removed from the air swirler, and the annular inner wall of the air swirler and the annular outer wall of the fuel injector head having inter-engaging radially and axially extending faces arranged to align the fuel injector head axially within the air swirler and to align the fuel injector head radially within the air swirler, wherein the air swirler comprises a plurality of swirl vanes extending radially outwardly from the annular inner wall, the annular inner wall of the air swirler has an upstream end and a downstream end and the swirl vanes are secured to a second portion of the annular inner wall, the annular inner wall has a third portion in which the inner diameter of the annular inner wall is less than the outer diameter of the first portion of the annular outer wall of the fuel injector head, the third portion of the annular inner wall is downstream of the second portion of the annular inner wall and the inner diameter of the second portion of the annular inner wall is greater than the outer diameter of the first portion of the annular outer wall of the fuel injector head to axially locate the fuel injector head in the air swirler, the annular outer wall of the fuel injector head has an upstream end and a downstream end, the annular outer wall having a second portion upstream of the first portion and a third portion downstream of the first portion and the outer diameter of the third portion are substantially the same as the inner diameter of the third portion of the annular inner wall of the air swirler, and the inner diameter of the second portion of the annular inner wall increases to a maximum diameter from the first portion to define a ramp and there is a radial step at the intersection of the second portion and the third portion of the annular inner wall.

21. A combustion chamber assembly comprising a combustion chamber including an upstream end wall having at least one aperture and at least one fuel injector, an air swirler located within the aperture, the air swirler being mounted in the aperture such that the air swirler is movable radially with respect to the aperture, the air swirler having an annular inner wall, the annular inner wall of the air swirler having a first portion, the at least one fuel injector comprising a fuel feed arm and a fuel injector head, the fuel injector head of the at least one fuel injector being arranged coaxially within the air swirler, the fuel injector head having an annular outer wall, the annular outer wall of the fuel injector head having a first portion, the inner diameter of the first portion of the annular inner wall of the air swirler being less than the outer diameter of the first portion of the annular outer wall of the fuel injector head, one of the first portion of the annular inner wall of the air swirler and the first portion of the annular outer wall of the fuel injector head being elastically radially deformable to allow the fuel injector head to be installed and removed from the air swirler, and the annular inner wall of the air swirler and the annular outer wall of the fuel injector head having inter-engaging radially and axially extending faces arranged to align the fuel injector head axially within the air swirler and to align the fuel injector head radially within the air swirler, wherein the air swirler comprises a plurality of swirl vanes extending radially outwardly from the annular inner wall, the annular inner wall of the air swirler has an upstream end and a downstream end and the swirl vanes are secured to a second portion of the annular inner wall, the annular inner wall has a third portion in which the inner diameter of the annular inner wall is less than the outer diameter of the first portion of the annular outer wall of the fuel injector head, the third portion of the annular inner wall is downstream of the second portion of the annular inner wall and the inner diameter of the second portion of the annular inner wall is greater than the outer diameter of the first portion of the annular outer wall of the fuel injector head to axially locate the fuel injector head in the air swirler, the annular outer wall of the fuel injector head has an upstream end and a downstream end, the annular outer wall having a second portion upstream of the first portion and a third portion downstream of the first portion and the outer diameter of the third portion are substantially the same as the inner diameter of the third portion of the annular inner wall of the air swirler, and the outer diameter of the first portion of the annular outer wall gradually increases to a maximum diameter from the second portion to form a first ramp and the outer diameter gradually decreases from the maximum diameter to from a second ramp and there is a radial step at the intersection of the first portion and the third portion of the annular outer wall.

* * * * *